United States Patent
Zaitsev

(10) Patent No.: US 9,021,584 B2
(45) Date of Patent: Apr. 28, 2015

(54) SYSTEM AND METHOD FOR ASSESSING DANGER OF SOFTWARE USING PRIORITIZED RULES

(71) Applicant: Kaspersky Lab ZAO, Moscow (RU)

(72) Inventor: Oleg V. Zaitsev, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 26 days.

(21) Appl. No.: 13/705,282

(22) Filed: Dec. 5, 2012

(65) Prior Publication Data
US 2014/0096184 A1    Apr. 3, 2014

(30) Foreign Application Priority Data
Sep. 28, 2012    (RU) ................................ 2012141478

(51) Int. Cl.
G06F 21/56    (2013.01)
G06F 21/57    (2013.01)
G06F 21/50    (2013.01)

(52) U.S. Cl.
CPC ............... *G06F 21/50* (2013.01); *G06F 21/56* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 7,530,106 B1 | 5/2009 | Zaitsev et al. | |
| 8,161,552 B1 * | 4/2012 | Sun et al. | 726/22 |
| 8,261,340 B2 * | 9/2012 | Chauhan et al. | 726/13 |
| 8,627,458 B2 * | 1/2014 | Muttik | 726/22 |
| 2007/0079379 A1 * | 4/2007 | Sprosts et al. | 726/24 |

* cited by examiner

*Primary Examiner* — Gilberto Barron, Jr.
*Assistant Examiner* — Simon Kanaan
(74) *Attorney, Agent, or Firm* — Arent Fox LLP; Michael Fainberg

(57) ABSTRACT

Disclosed are system, method and computer program product for assessing security danger of software. The system collects information about a suspicious, high-danger software objects, including one or more malicious characteristics of the software object, security rating of the software object, and information about one or more security rating rules used in assessing the security rating of the software object. The system then determines whether the suspicious object is a clean (i.e., harmless). When the suspicious object is determined to be clean, the system identifies one or more unique, non-malicious characteristics of the software object and generates a new security rating rule that identifies the software object as clean based on the one or more selected non-malicious characteristics. The system then assigns high priority ranking to the new security rating rule to ensure that the rule precedes all other rules.

19 Claims, 6 Drawing Sheets

SYSTEM AND METHOD FOR ASSESSING DANGER OF SOFTWARE USING PRIORITIZED RULES

CROSS-REFERENCE TO RELATED APPLICATIONS

This application claims benefit of priority under 35 U.S.C. 119(a)-(d) to a Russian Application No. 2012141478 filed on Sep. 28, 2012.

TECHNICAL FIELD

This disclosure generally relates to the field of computer security, and specifically to systems, methods and computer program products for assessing security danger of software.

BACKGROUND

The rapid growth of computer and network technologies has resulted in surge of computer malware, such as viruses, worms, Trojans, spam, etc. Computer malware is typically designed to gain unauthorized access to personal computers, mobile communication devices, network servers, databases, etc., in order to cause damage or steal information. To combat malware, many different computer and network security technologies have been developed, such as antivirus, anti-spyware, firewalls, anti-spam software, etc. However, the most effective mechanism of defense from malware remains antivirus software. Antivirus software uses various malware detection techniques, such as signature checking, heuristic analysis and behavioral analysis to detect known and sometimes newly emerging types of malware.

The signature analysis is a classic method of detection of malicious software objects. The signatures contain samples of the code of malicious program that characterize that program. The majority of modern antivirus programs use malware signatures taken directly from malicious file or network packets. Antivirus programs typically perform signature analysis during scanning of files or network packets for potentially dangerous program. If, during such a scan, a code is found that corresponds to the signature code, then the object with this code is classified as malicious. The signature analysis typically effective in detection of known malicious objects described by signatures, but often fails to detect unknown malware.

Heuristic analysis is an expert-based analysis that determines the susceptibility of a system towards particular threat/risk using various decision rules or weighing methods. Most antivirus programs that utilize heuristic analysis perform this function by emulating execution of a suspicious file, thereby allowing the antivirus program to internally simulate what would happen if the suspicious file were to be executed while keeping the suspicious code isolated from the real-world machine. It then analyzes the commands as they are performed, monitoring for common viral activities such as replication, file overwrites, and attempts to hide the existence of the suspicious file. If any malicious actions are detected, the suspicious file is flagged as a potential malware, and the user alerted. However, the heuristic analysis often fails to detect new computer viruses and also often results in false detection of malware.

The behavioral analysis monitors processes launched by programs to identify malicious behavior patterns (or signatures). For instance, if a program writes data in sector 1, track 0, side 0, then this action makes changes in sectioning of the hard disc drive. However, except for the auxiliary program "fdisc" and other similar utilities, this command is not used by any other program. Thus, if a program suddenly performs this action, it must be a boot virus (bootkit) malware. When malware is detected, antivirus software can take defensive actions such as terminating processes launched by the malware. One shortcoming of the behavioral analysis is that behavioral signatures typically do not cover all known malware because they also produce false positives when detecting clean programs. In addition, the development of heuristic and behavioral signatures is very resource-intensive and requires expertise.

To overcome deficiencies of individual malware analysis methods, many modern antivirus applications use several different detection techniques together in order to increase the effectiveness of detection of known and unknown malware by taking the advantages of different detection techniques, which mutually compensate for their individual deficiencies. However, different detection techniques can give different results, which may cause mistakes in operation of the antivirus software. These mistakes typically fall into two categories. The first category of mistakes includes an erroneous characterization of dean objects as malicious. These mistakes are known as false positives. The second category of mistakes includes a failure to detect malicious objects. These mistakes are known as false negatives.

In order to improve effectiveness of operation of the antivirus application that uses different malware detection techniques, it is desirable to minimize both types of mistakes.

SUMMARY

Disclosed system, method and computer program product for improving the effectiveness of operation of antivirus application by lowering the incidents of false positive and false negative detections of malware by using security rating rules that assess danger of software objects. In one example implementation, a system for assessing danger of software objects collects information about a suspicious (e.g., high-danger) software object, including one or more malicious characteristics of the software object, a security rating of the software object, and information about one or more security rating rules used in assessing the security rating of the software object. The system then determines whether the suspicious software object is a clean (i.e., harmless). When the suspicious software object is determined to be clean, the system identifies one or more unique non-malicious characteristics of the software object and generates a new security rating rule that identifies the software object as clean based on the one or more selected non-malicious characteristics of the software object. The system then determines priority ranking of the security rating rules used in assessing the security rating of the software object. The priority ranking specifies the order in which the security rating rules are applied to assess security rating of the software object. The system then assigns to the new security rule a higher priority ranking than the priority ranking of each of the security rating rules used in assessing the security rating of the software object.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description, serve to explain their principles and implementations.

In the drawings.

DETAILED DESCRIPTION OF EXAMPLE EMBODIMENTS

Figure 1:
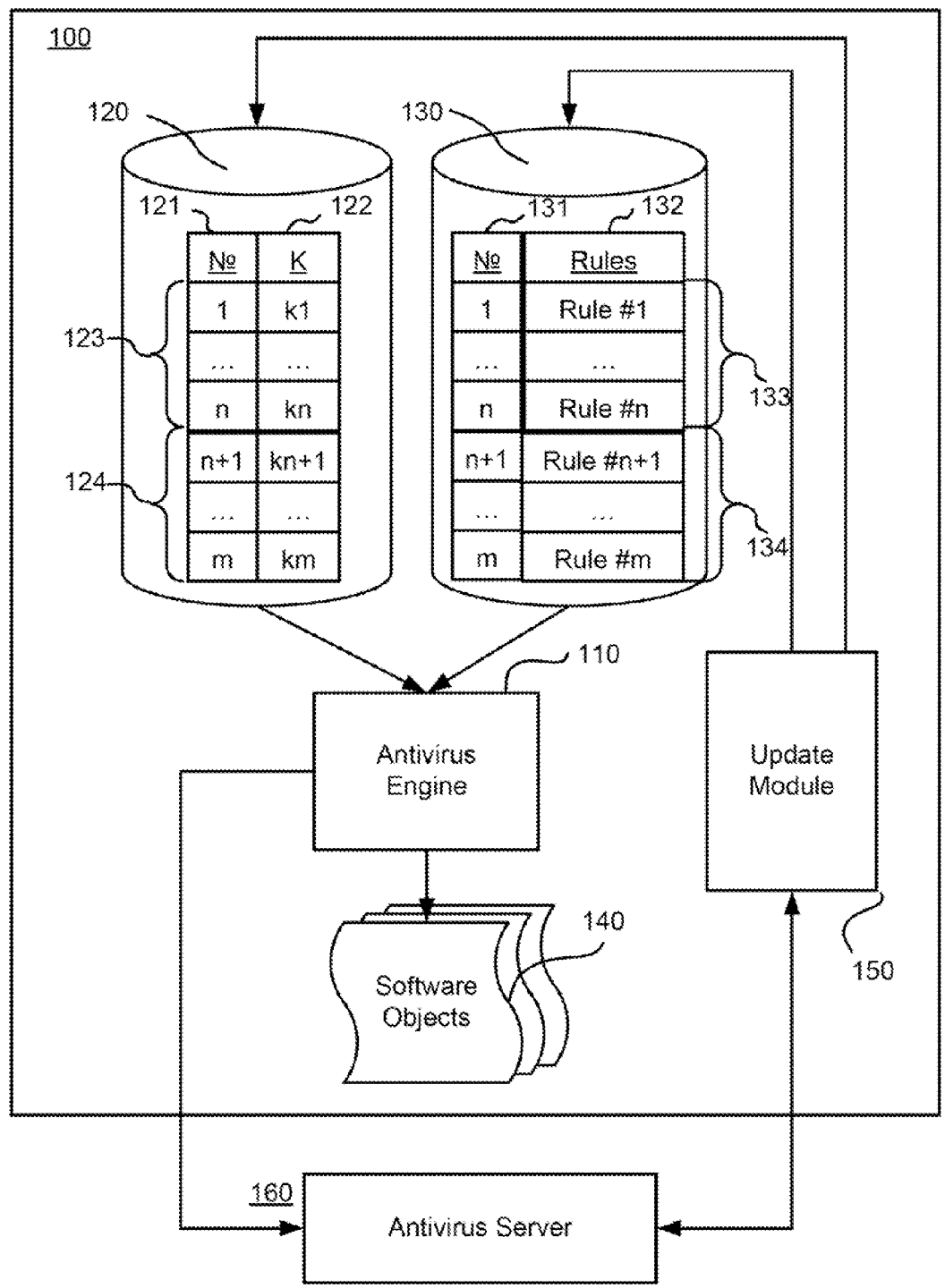
FIG. 1 illustrates an example embodiment of a client-side system for assessing danger of software objects using prioritizes security rating rules.

Example embodiments, implementations and aspects of the invention are described herein in the context of systems, methods and computer program products for assessing danger of software objects using prioritizes security rating rules. Those of ordinary skill in the art will realize that the following description is illustrative only and is not intended to be in any way limiting. Other embodiments and implementations will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

The disclosed system for assessing danger of software objects is based on system disclosed in the commonly owned U.S. Pat. No. 7,530,106. The patented system detects malicious objects by measuring object's security rating, calculated using security rating rules, against different levels of danger. The security rating rules are created based on the analysis of behavior of known malicious objects. Each rule has a specific structure: a unique rule identifier, an Application Program Interface (API) function called by the malicious object, parameters of the API function, and a security rating given by the rule when it is activated or triggered. The security rating rule is activated when, during analysis of a software object by the antivirus application, the object makes specific API function call(s) with specific parameters identified by a security rating rule. When the security rating rule is activated, the antivirus application increases the total security rating of the software object by a security rating coefficient specified in the activated security rating rule. When one or more security rating rules are triggered, and the total security rating of the suspicious objects exceeds a certain danger level, the software object may be classified to be malicious and processes of the object may be blocked. Thus, the greater is the security rating of the object the more dangerous it is.

In the patented technology, all security rating rules work independently from each other. Because of that, one rule is used to describe exactly one malicious operation (e.g., an API function call with parameters that are typical for a particular malicious activity). However, this limitation of the patented technology may cause false positive errors. For example, when a multimedia player application, used for playing and streaming multimedia files, is installed on a user's computer, the application updates operating system libraries and deletes older versions of application files from system folders. Because malicious programs also frequently manipulate system files, there is a security rating rule that monitors the deletion of system files. This security rating rule will be activated when multimedia player application attempts to update certain application files in system folders. The activated security rating rule will increase in the security rating of the multimedia player application, which in turn may cause termination of the multimedia player application by the antivirus program.

A solution to the problem of false positive errors during malware detection is to identify known clean programs and create new clarifying security rating rules that will not raise security rating of known clean software objects, and at the same time not interfere with operation of the old security rating rules that detect malicious software objects. Particularly, when a particular security rating rule erroneously triggered by a clean object (e.g., when a clean object calls API functions with parameters typical for malicious activity), then a new security rating rule may be created for this particular clean object or behavior. The new rule may be given higher priority ranking than the old rules that describes the malicious activity.

The priority ranking is a formal property of a security rating rule that defines the order in which security rating rules are applied during analysis of a suspicious object by the antivirus application. For example, the security rating rules for detection of clean objects may have higher priority ranking than the security rating rules for detection of malicious behaviors. In this manner, a program is first analyzed for execution of harmless actions by the security rating rules of clean objects, and later analyzed for execution of malicious actions by the security rating rules of malicious behaviors. The rules for detecting harmless and malicious behaviors do not have the same priority ranking, since the analysis is done in the sequence of priorities until one of the security rating rules is triggered. This means that if a rule with the sequence number N is triggered for a particular API function call by a suspicious object, then using of other rules with sequence numbers greater than N for the same API function call may not be necessary. In other words, if a security rating rule with highest priority indicates that the suspicious object is clean, then using of security rating rules with lower priority, which may indicate that the suspicious object is malicious, may no longer be necessary in some implementations.

In one example embodiment, priority ranking to the new security rating rules can be assigned through the hierarchy of priorities, which is used by default in absence of explicit assignment of priority to a new security ranking rule by the system or user. The security rating rules can be then stored in a list in order of their priority ranking. The list can be stored in a data file maintained by the antivirus application. This way, the rules in the beginning of the list may have higher priority ranking. In other words, the priority ranking can be determined based on the order of the security rating rules in the table of priorities. Table #1 below gives a sample set of security rating rules ordered by their priority ranking for a file deletion operation.

TABLE #1

| Priority Ranking | Security Rating Rule | Security rating | Conditions of activation |
|---|---|---|---|
| 1 | Preventing a mistake of the first type (false positive detection), when an program deletes a file | 0 | Deletion of a file, whose name or location is identified in a list of files with which all operations are allowed. |
| 2 | Preventing a mistake of the first type (false positive detection), when an program deletes a file | 0 | Deletion of a file, whose name or location is identified in a list of files which are allowed to be deleted. |
| 3 | Preventing a mistake of the first type (false positive detection) on an auto-run program, whose deletion is not critical | 0 | Deletion of a file, whose name or location is identified in a list of files which can be deleted from the auto-run folder. |
| 4 | The deletion of the critical system objects | 100% | The object is being deleted, whose name is recorded in the updatable directory of the critical system objects. |
| 5 | The deletion of a file belonging to an antivirus software | 100% | The object is being deleted, whose name is located in the updatable directory of the names of the executable files that belong to the antivirus and/or security software. |
| 6 | The manipulation (e.g., deletion) of the autorun.inf file | 90% | The attempt to delete autorun.inf in the root of any disc. The deletion of this file is done by malicious programs in order to record the changed autorun.inf file. |
| 7 | The deletion of a file belonging to an antivirus software | 90% | The object, located in the catalogue of the antivirus software is being deleted |
| 8 | The deletion of the file from the system folder "c:\windows\system32\Drivers" | 60% | |
| 9 | The deletion of the file from the system folder "c:\windows\system32\" | 50% | |
| 10 | The deletion of the file from the system folder "c:\windows\" | 40% | |
| 11 | The deletion of an object from the auto-run folder | 20% | |
| 12 | The deletion of a file from the folder "c:\program files\" | 15% | |
| 13 | The deletion of some file | 5% | Some file is being deleted |

Several example of the use of these security rating rules are provided below:

For example, a program is attempting to delete a file "C:\Program Files\Kaspersky Lab\Kaspersky Internet Security 2012\avp.exe". This action triggers rules #5, #7, #12 and #13. However, only rule #5, which has the highest priority ranking, will be implemented. Rule #5 gives high security rating to the program, and the action of the program may be blocked.

In another example, a program attempts to delete a file "C:\WINDOWS\TEMP\setupextdat". This action triggers rules #10 and #13 because the file is being deleted from the folder "TEMP", which, in general, is enough to block this program and cause a mistake of the first type (false positive detection). However, this action also triggers rule #2, which has higher priority ranking than rules #10 and #13, and which says that any file can be deleted from directory "C:\WINDOWS\TEMP\". Therefore, the security rating of rule #2 is going to be used and, instead of raising the security rating by 40%, as specified by rule #10, the security rating for the analyzed program is going to remain the same, as specified by rule #2. Due to low security rating given to the program, deletion of the file may be permitted.

In another example, a program attempts to perform DeleteFile operation on file "C:\WINDOWS\EurikaLog.ini". If security rating rules #10 and #13 are triggered, it would cause the mistake of the second type (false negative detection). However, if file EurikaLog.ini is identified in a list of files with which all operations are allowed, the rule #1, which has higher priority ranking than rule #10 and #13, will be triggered and the deletion of the file is allowed. In accordance with the rule #1, the security rating for this program is not increased.

In another example, a program attempts to perform DeleteFile operation on file "C:\WINDOWS\system32\drivers\PROCEXP90.SYS". This kind of behavior is typical for the program ProcessExplorer. The name of this program is added to the corresponding parameters of rule #2. The implementation of all the conditions of the rule #2 would prevent the mistake of the first type, which would happen if the rule #8 is mistakenly used. The latter would raise the security rating of the program (i.e., its danger indicator) by 60%.

FIG. 1 is an example embodiment of a client-side system for assessing danger of software objects using prioritizes security rating rules. System 100 can be implemented as an antivirus application stored in a memory and executable by a processor of a client computer, such as a personal computer, notebook, tablet, smart phone, or the like. System 100 includes an antivirus engine 110 that performs antivirus analysis of software objects 140, such as programs, files, emails, macros, applets, etc., and, in a particular embodiment, processes and threads launched by these objects, using various malware detection techniques, such as signature checking, heuristic analysis or behavior analysis. In one example implementation, the antivirus engine 110 may perform rating of danger of software objects 140 using security rating rules 132 stored in a local rules database 130. Based on the rules activated during analysis of a software object 140, the antivirus engine 110 increases (or decreases) the total security rating of the analyzed object 140. Several different security rating rules 132 can be activated during analysis of the object 140. When the total security rating of the object exceeds a certain danger level, the object may be declared malicious, as described in the U.S. Pat. No. 7,530,106.

In one example embodiment, each security rating rule 132 in rules database 130 has a unique identifier 131. In one example implementation, the security rating rules 132 may be divided into two groups 133 and 134. Rules in group 133 are used for analyzing for malicious characteristics (e.g., malicious API function calls) of software objects 140; therefore, these rules generally increase the security rating of software objects that trigger these rules. Examples of rules in group 133 are rules 4-13 in Table 1 above. Security rating rules in group 134 describe clean software objects or non-malicious behaviors; therefore, these rules generally do not increase or decrease the security rating of objects that trigger these rules. Examples of rules in group 134 are rules 1-3 in Table 1 above. There may be other types of security rating rules.

In one example embodiment, system 100 also includes priorities database 120 which includes priority ranking for the security rating rules 132 from database 130. Particularly, every rule 132 from the database 130 has a corresponding priority ranking (k) 122 in the database 120. Priority rankings 122 have unique identifiers 121 that correspond to the rules identifiers 131 for matching each rule 132 to its priority ranking 122. Each rule may have a basic coefficient $p_i$ (i= 1 . . . n, where "n" is the number of the last rule) that determines the security rating given by the rule. This basic coefficient p can change only when the rule itself is changed after the update of the database 132. The basic coefficient p will be described in greater detail below with reference to FIG. 4. In one example implementation, similar to the rules database 131, the priorities database 120 may be divided into two groups: first group 123 containing priority rankings k that correspond to the rules that increase the security rating of the analyzed software objects, and the second group 124 containing priority rankings k that correspond to the rules that do not increase or decrease the security rating of the analyzed software objects.

In one example embodiment, the antivirus engine 110 is configured to send information about high-danger objects (e.g., security rating above 50%) to the antivirus server 160 for further analysis. The transmitted information may include, but not limited to one or more malicious characteristics of the software object, a security rating of the software object, information about one or more security rating rules used in assessing the security rating of the software object, and other types of data. The antivirus server 160 is configured to analyze this information and provide updates for the security rating rules through the update module 150 if a clean object was incorrectly identified as malicious by one of the security rating rules 132.

Figure 2:
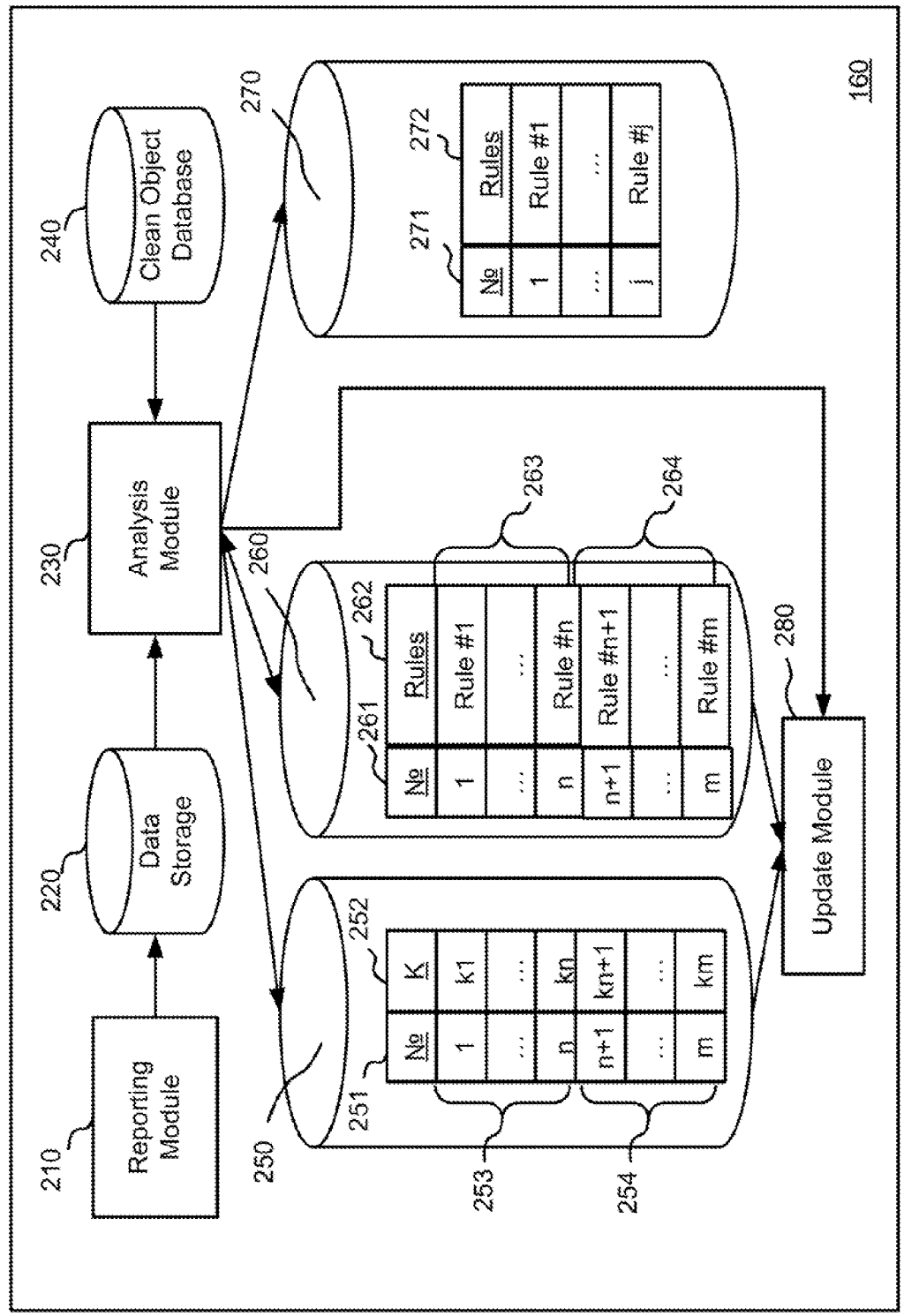
FIG. 2 illustrates an example embodiment of a server-side system for assessing danger of software objects using prioritizes security rating rules.
Figure 3:
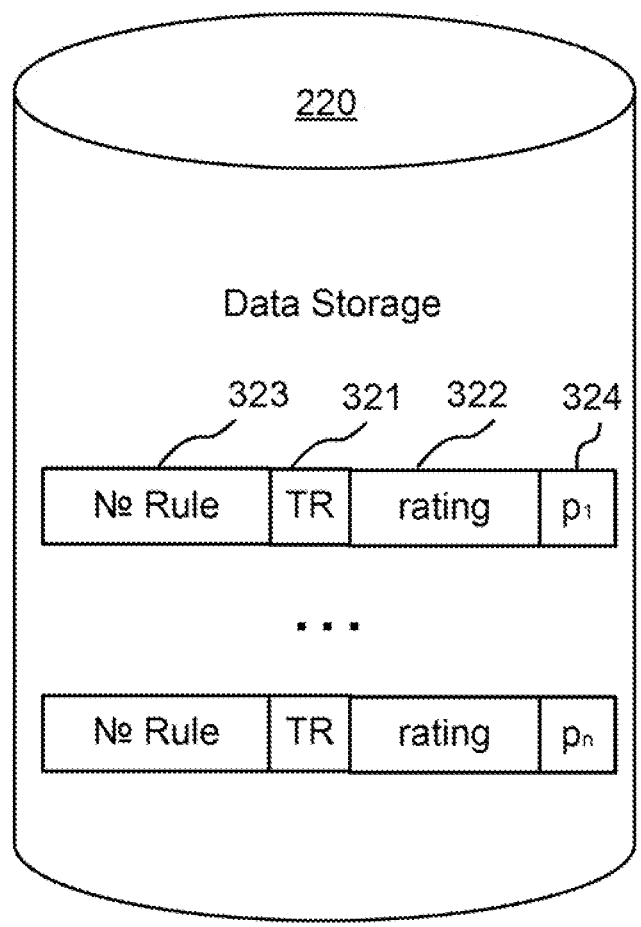
FIG. 3 illustrates an example embodiment of a data structure for storing information about analyzed software objects.

FIG. 2 is an example embodiment of a server-side system for assessing danger of software objects using prioritizes security rating rules. The server system 160 includes a reporting module 210 that receives and unpacks data received from client-side system 100. The data may include, but not limited to the information about suspicious (or malicious) objects and activated security rating rules for each software objects. The reporting module 210 stores received data in storage 220. One example embodiment of the storage 220 is shown in FIG. 3.

The data in storage 220 is recorded in form of a relational database table. Each line contains the information on a detected object, including but not limited to the control sum (e.g., hash) of the object 321, the total security rating R of the object 322, the identifiers of the activated rules 323, and security ratings given by each rule 324. Next, the collected data is passed to the analysis module 230 that compares the suspicious (or malicious) high-danger objects with a list of know clean objects 240. If the suspicious object was identified as clean, additional analysis is performed. Particularly, the analysis module 230 identifies specific API calls of the clean object that uniquely characterize "clean" operations of the object. Those attributes of the clean object are used to form a new security rating rule (or modify old security rating rules), which would lower the significance of those rules that increased the security rating of this clean object.

The new rule may have a higher priority ranking in comparison with the previous (old) security rating rules. This changing of priority ranking can be implemented using different methods. In one implementation, the new security rating rule may lower the total security rating. Lowering the security rating is preferred in the beginning of analyzing, so the security rating does not go over the danger level of malicious objects. Thus, the analyzing by all subsequent security rating rules will not raise the security rating of the clean object above the specified level of danger, and the software object is not going to be considered malicious. In this case, the new rule may have security rating having a negative value to achieve lowering of the total security rating of the analyzed object, as well as the clarified values of parameters of API calls of the object that characterize its harmless behavior. The new security rating rule may be sent to update module 280 for transfer to the update module 150 on the client-side system 100.

In one example implementation, the antivirus server 160 may perform a general analysis of collected data and operation analysis of data. The general analysis may be performed less frequently than the operational analysis, which can be performed in real time upon request from a client computer 100. When the general analysis is performed, the analysis module 230 processes the data collected during a certain time period, e.g., one week. As the result of the general analysis, the analysis module 230 updates a rules database 260 containing information on new/updated/modified security rating rules 262. This database contains rule identifiers 261 and modified rules 262, which contributed to forming the ratings of malicious objects. In one example implementation, the modifications to the rule may include changes to the basic coefficient p that determines security rating given by the rule. The changes may also include correction and clarification of API function calls and associated parameters that described harmless or malicious behavior of software objects. Also, similarly to the client-side rules database 130, the rules in database 262 may be divided into two groups: the first group 263 contains rules that increase the security rating of analyzed objects, and the second group 264 contains rules that do not increase or decrease the security rating of the analyzed object.

In one example embodiment, after updating rules database 260, the analysis module 230 also updates priorities database 250 containing information on the priority ranking of security rating rules. Database 250 lists the identifiers 251 of the security rating rules 262 and their corresponding priority rankings (k) 252. Similarly to the database of the priority database 120 on the client side, the priority database 252 may be divided into two groups: first group 253 containing priority rankings that correspond to the rules that increase the security rating of the analyzed software objects, and the second group 254 containing priority rankings that correspond to the rules that neither increase nor decrease the security rating of analyzed objects. After the priorities database 250 is updated, this database becomes accessible to all client computers 100 for updating. Upon completion, the database 250 may be small in size (kilobytes or less), which makes frequent updating easier. With the help of the assigned order of security rating rules, the contribution of the rules to forming ratings can be changed. In further antivirus analysis, any harmless objects, which were previously classified as dangerous, are going to be omitted by the antivirus engine 110.

In one example implementation, new security rating rules describing a clean software object(s) or harmless behavior(s) may be separately recorded in a new rules database 270 before accuracy of their operation has been tested and verified. The new rules may be recorded in a table in which column 271 specifies rule identifier numbers and column 272 includes the rules themselves. In one example implementation, the analysis module 230 performs testing of the new security rating rules 272 using known malicious objects. Since these security rating rules suppose to detect only clean object(s) or harmless behavior(s), these new rules are not supposed to be activated by malicious objects. If one of the new rules is incorrectly activated by a malicious object, then analysis module 230 searches in data storage 220 for additional attributes (e.g., API function call and associated parameters) of the clean object that distinguish the object from harmless behavior that triggered the rule, and updates the new rule accordingly. In addition, if the analysis module 230 has to respond to a request from client-side antivirus engine 110, then module 230 may identify other security rating rules that were triggered by the same clean object, compute an average security rating for this object, and send response to the client-side antivirus engine 110. The antivirus engine 110 uses received average security rating as an operational rating and instead of a statistical security rating, when it calculates the total security rating for the analyzed software object.

Figure 4:
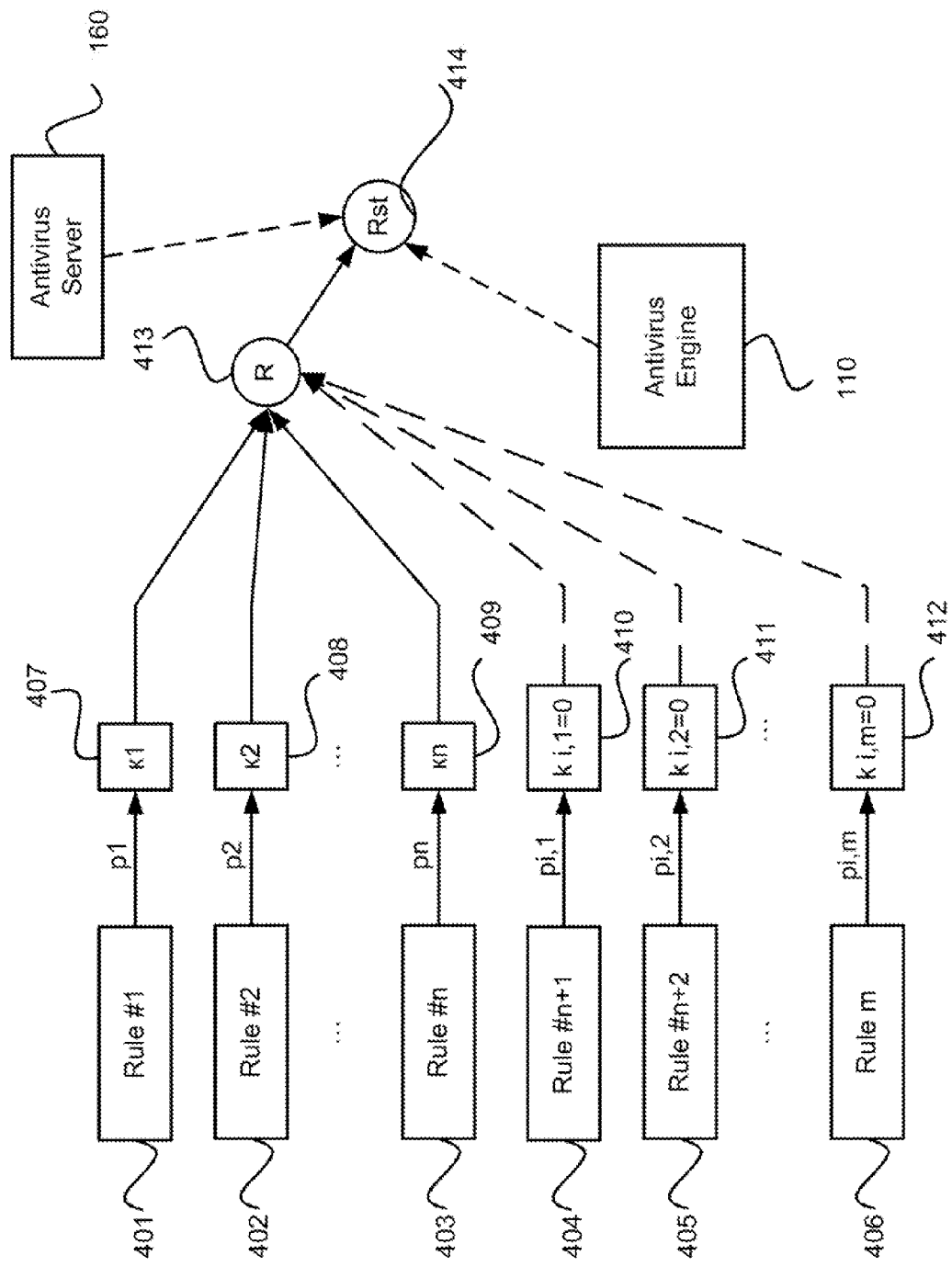
FIG. 4 illustrates example implementation of a method of computing security ratings of software objects.

FIG. 4 shows an example implementation of a method of computing security rating for a software object during antivirus analysis. The antivirus engine 110 performs antivirus analysis of a software object 140 on the user's computer 100 by applying different security rating rules 132 and collecting information about activated rules, i.e., rules that identify the analyzed object or its processes as clean or dangerous. During analysis, the antivirus engine 110 uses the rules database 130 and the priorities database 120. Several different rules 401-403 can be activated. Each rule has a basic coefficient $p_i$ (i=1 ... n, where n is the number of the last rule) that determines the security rating given by the rule to the analyzed object. The priority rankings (k) 407-409 of rules 401-403, which are specified in the priorities database 120, may be also taken into account during calculation of the total security rating (R).

During determination of the priority ranking (k) of a given security rating rule, the system considers all clean objects that can be incorrectly classified as malicious by the given rule. In one example implementation, the more clean objects described by the given rule, the higher is the priority ranking k of this rule in the priorities database 120. In one example implementation, the priority ranking or a rule may be calculated using statistical data received from the users' computers. This data shows how often the analyzed objects appear on the users' computers. This data can be analyzed using the following techniques: fuzzy logic, imitational modeling, artificial neural networks, and the method of the support vectors.

In addition, the priority rankings 406-409 of rules 401-403 are also taken into account in computation of the total security rating R for the analyzed object Static rating (Rst) 414 also influences the total rating R. The static rating 414 may be determined by the antivirus engine 110 during the initial analysis of the analyzed software object using simple security rating rules without actually executing the object. These security rating rules may analyze such properties of the object as: its location, its size, its file type, and other properties.

As explained above, several different security rating rules can be triggered by one software object. Each activated rule contributes to the determination of the total security rating R 413 of the analyzed object. The security ratings of each rule may be added to compute R. In addition, a mechanism is provided to account for multiple repeating events (e.g., multiple identical API function calls or other actions) by the analyzed object, which is used to gradually increase object's security rating. For example, non-linear dependency of security rating coefficient p on the number of events can be assigned as follows: (pi,1, pi,2, pi,3, . . . , pi,m)=(5%, 25%, 25%, 80%). In a more specific example, an object can make multiple write file requests, and the appropriate security rating coefficients p can be assigned as follows: (pi,1, pi,2, pi, 3, . . . , pi,m)=(10%, 15%, 15%, . . . , 0%). The corresponding priority ranking coefficients (ki,1, ki,2, ki,3, . . . , ki,m) may all be equal to zero (see the FIG. 4, the positions 410-412), which would preclude blocking of the object on the basis of making multiple write requests; the corresponding security rating rules 404-406 have the value of priority ranking k equal to zero. This situation shows that analyzed objects are not allowed to be blocked on the basis of this rule and that rules with lower priority do not contribute to the calculation of the total security rating R.

In another example, the system resolves a problem of incorrectly classifying as malicious an installation process of a non-malicious text editor program on a user computer. When a text editor program is being installed on the user computer 100, the installing program of the editor adds a dynamic library to the list of the auto run components of the OS. Some types of malware have similar behavior, i.e., adding its files to the list of auto run components of the OS in order to execute malicious functions after reloading of the OS. The client-side rules database 130 contains a security rating rule that detects all software objects and their process that add their components without permission to the list of auto run components of the OS and automatically blocks these software objects and processes. However, the text editor does not show other signs of malicious activity during the analysis by the antivirus engine 110, and may be classified as suspicious. Therefore, it becomes necessary to keep the current security rating rule that registers the addition of a component to the list of the auto run components of the OS, and concurrently prevent blocking of the installation process of the harmless text editor.

The following method is the example of the solution for this problem:

The client computer 100 sends to the antivirus server 160 information about detected suspicious object, i.e., text editor program. This message received and processed by the reporting module 210 that records the received information in the data storage 220. The data then retrieved by the analysis module 230, which compares suspicious objects with the list of known clean objects in the module. The analysis will confirm that text editor application is a clean object. The analysis module 230 then performs additional analysis of the clean object to identify unique characteristics (e.g., API function calls and their parameters) that distinguish this object from "malicious" characteristics of that object that triggered the security rating rule in first place. Once such characteristics are identified, analysis module 230 generates a new clarifying securing rating rule for this object. This rule will be given higher priority ranking than priority ranking of the security rating rule originally activated by the object, i.e., the rule that blocked the installation of the text editor on the client computer 100. For example, the new clarifying rule checks the same API function as the old rule, which has called for blocking the object, but the parameters of this API function are specified in great detail in the new rule. Particularly, the parameter of the API function may be a registry key, which is characteristic of the installation of the text editor, as well as the name of the parameter of the registry key and value of the parameter of the registry key in the list of the auto run components of the OS.

Following is the example of the generated new clarifying rule:

The rule "Creation of the auto-run key"
The identifier of the rule: 484
Type: clarifying rule
API function: Registry: value of the parameter (RegSetValueEx)
  Condition for the argument #1: Contains the entry "\Registry\Machine\Software\Classes\*\shellex\ContextMenuHandlers\Notepad++" Condition for the argument #2:*
  Condition for the arguments #3 . . . N:*
  Security rating: single operation—1, 2-3 operations—1, >3 operations—1
  Can the process be identified as malicious on the basis of this operation: No
  The date of the last modification: Mar. 25, 2011
  Notes: the clarifying rule for Notepad++
  *—notation symbol, signifying any allowed context of an argument The new clarifying security rating rule contains a value in the field "Security rating" that used to increase or decrease (e.g., −1) the security rating for the process being analyzed. The next field, "Can the process be identified as malicious on the basis of this operation" is a trigger that tells the antivirus engine 110 not to block the analyzed object. The new clarifying rule is sent to the updating module 280 of the antivirus server 160, which forwards it to the update module 150 of the user computer 100. The update module 150 stores the new clarifying rule in the rules database 130. Later, during the analysis of the process of the text editor by the antivirus engine 110, the new clarifying rule in the rules database 130 is going to be checked before the old security rating rule, which registers the addition of a component to the list of the auto run components of the OS. Thus, the trigger of the new clarifying rule prevents blocking of the installation process of the text editor program, whose analysis triggers several analogous rules, while old rules block similar processes of malicious objects.

In one example implementation, analogous security rating rules may have similar conditions, e.g., similar API function calls are being analyzed, and some of the arguments of the API function can partially match. For instance, two security rating rules that check API function calls of a software object that adds a new key to the OS registry may be considered analogous rules when the first rule checks the address of the registry tree branch being created in the list of the auto run components of the OS, and the second rule checks the parameters of an analogous API function, which is called to create a new section or subsection at the same registry tree branch that was checked by the first rule. Therefore, the first and second rules are analogous. Moreover, the second rule is a clarifying one, as it contains a clarifying trigger "No" in the field "Can the process be identified as malicious on the basis of this operation".

Security rating for a software object can be calculated differently when analogous rules are activated. In the preceding example, the installation process of a harmless text editor was found to be suspicious when conditions of several analogous security rating rules were fulfilled. If one of the activated rules is a clarifying rule (e.g., has an appropriate clarifying trigger parameter), then the antivirus engine performs additional steps in calculating security rating for the analyzed object. The total security rating R for the analyzed object may be calculated as a sum of individual security ratings k of each security rating rule, but the value of the security rating k of each security rating rule may be lowered several times for example.

The next example is of the installation of a language control program that changes keyboard symbols when language settings on the computer have changed. In its operation, the program monitors a sequence of symbols entered on the keyboard. If the user forgot to change language settings manually, the program registers atypical sequence of the symbols for the default language. The program then automatically changes keyboard language settings and changes the already entered symbols in to the symbols of the new language. For that reason, this program needs to install its own driver that controls keyboard input. Particularly, the driver intercepts keyboard input and changes the intercepted symbols into another language.

Rules based assessment of this program may give it high security rating because driver's actions are typical for the malicious software of the KeyLogger type. Basic KeyLoggers operate by intercepting keyboard input, while more sophisticate KeyLoggers perform additional functions, such as interception of the information from open programs, interception of the mouse clicks, interception of the data exchange buffer and other actions. When a KeyLogger infiltrates user's computer, it can steal personal data and confidential information.

Figure 5:
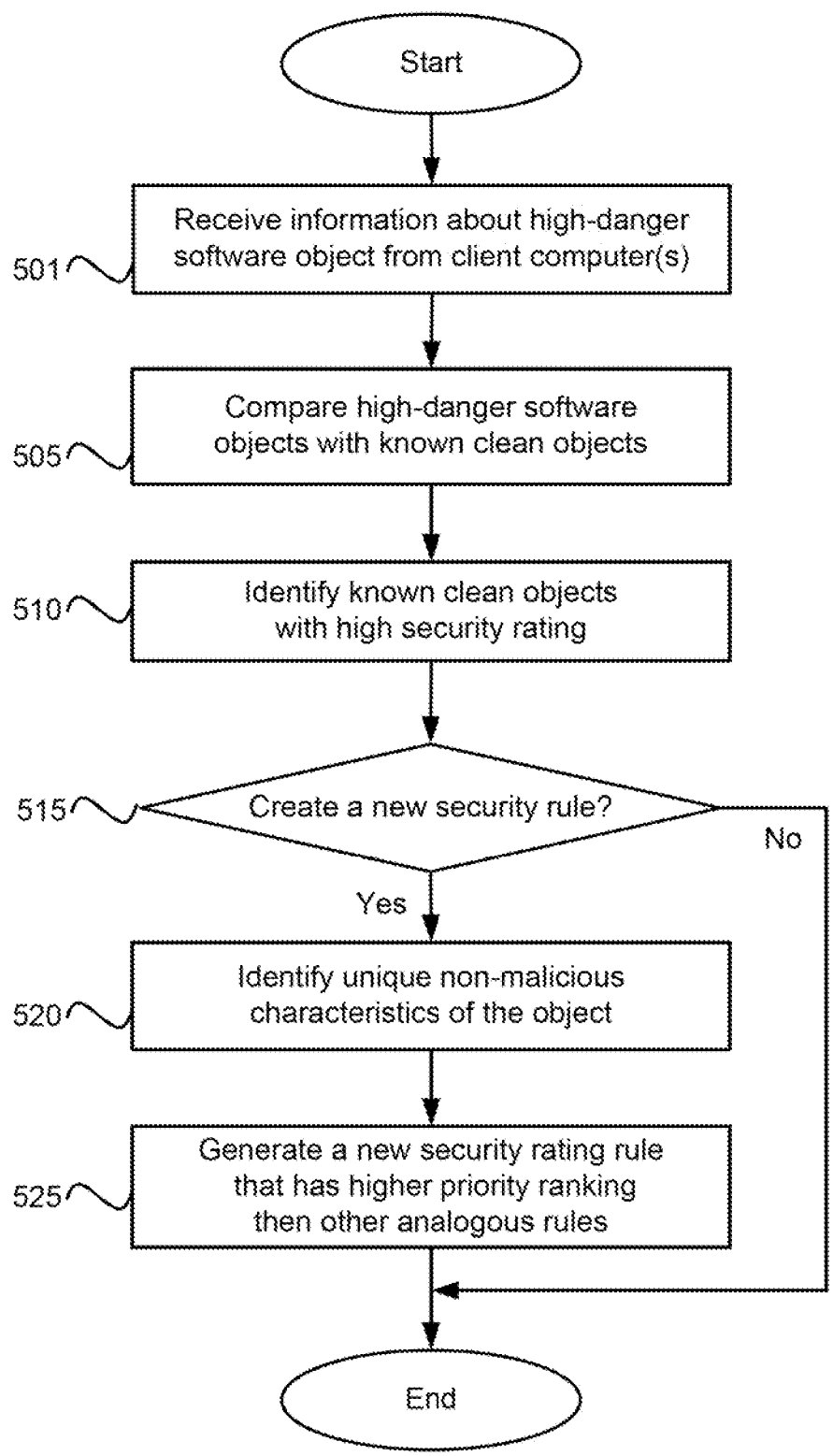
FIG. 5 illustrates an example implementation of a method for assessing danger of software objects using prioritizes security rating rules.

The security rating rules include rules for detecting and blocking installation of a program of the KeyLogger type on the user's computer. However, it is also necessary to allow clean language control program to work without obstructions. The method illustrated in FIG. 5 addresses both of these requirements through correct assessment of suspicious objects using prioritized security rating rules. According to the method, the antivirus engine assesses security rating of various software objects on the user computer, including the language control program when activities of the program's driver are detected by the antivirus engine. The program is given high security rating (i.e., suspicious or malicious) due to its KeyLogger-like behavior, so that antivirus engine collects information, e.g., statistics, on program's operation and information about activated security rating rules, and sends this information to the antivirus server for checking along with information about other suspicious (or malicious) objects detected on the user computer, at step 501. At step 505, the antivirus server compares information about high-danger programs with a list of known clean objects. At step 510, the known clean objects with high security rating are identified, such as the language control program. At step 515, the antivirus server assesses a need to create a new security rating rule for the identified objects, such as the language control program. For example, if, based on the collected statistical information about the program, including information collected from other user computers, it is determined that the program is a known and frequently used clean program, then a new security rating rule may be created for this program or a group of similar programs (e.g., legitimate language control programs). At step 520, the antivirus server identifies unique non-malicious characteristics of the program, e.g., non-malicious API functions calls and their specific parameters. At step 525, the antivirus server creates a new clarifying security rating rule that analyzes software objects for the identified unique non-malicious characteristics and gives low security rating to the objects that have these characteristics. For example, the new rule can contain specific parameters of the API function, sequences of the called API functions, names of files accessed by the object, addresses of the file/folder location of the object in data storage medium, accessed branches of the OS registry, names of the registry keys, and other specifics that help to identify the known clean program. Also, the antivirus server assigns a higher priority ranking to the new clarifying rule then the priority rankings of other analogous rules to ensure that the new rule is activated first Lastly, the antivirus server may send information about the new security rating rule to the client computer(s) to update their local rules and priorities databases.

Figure 6:
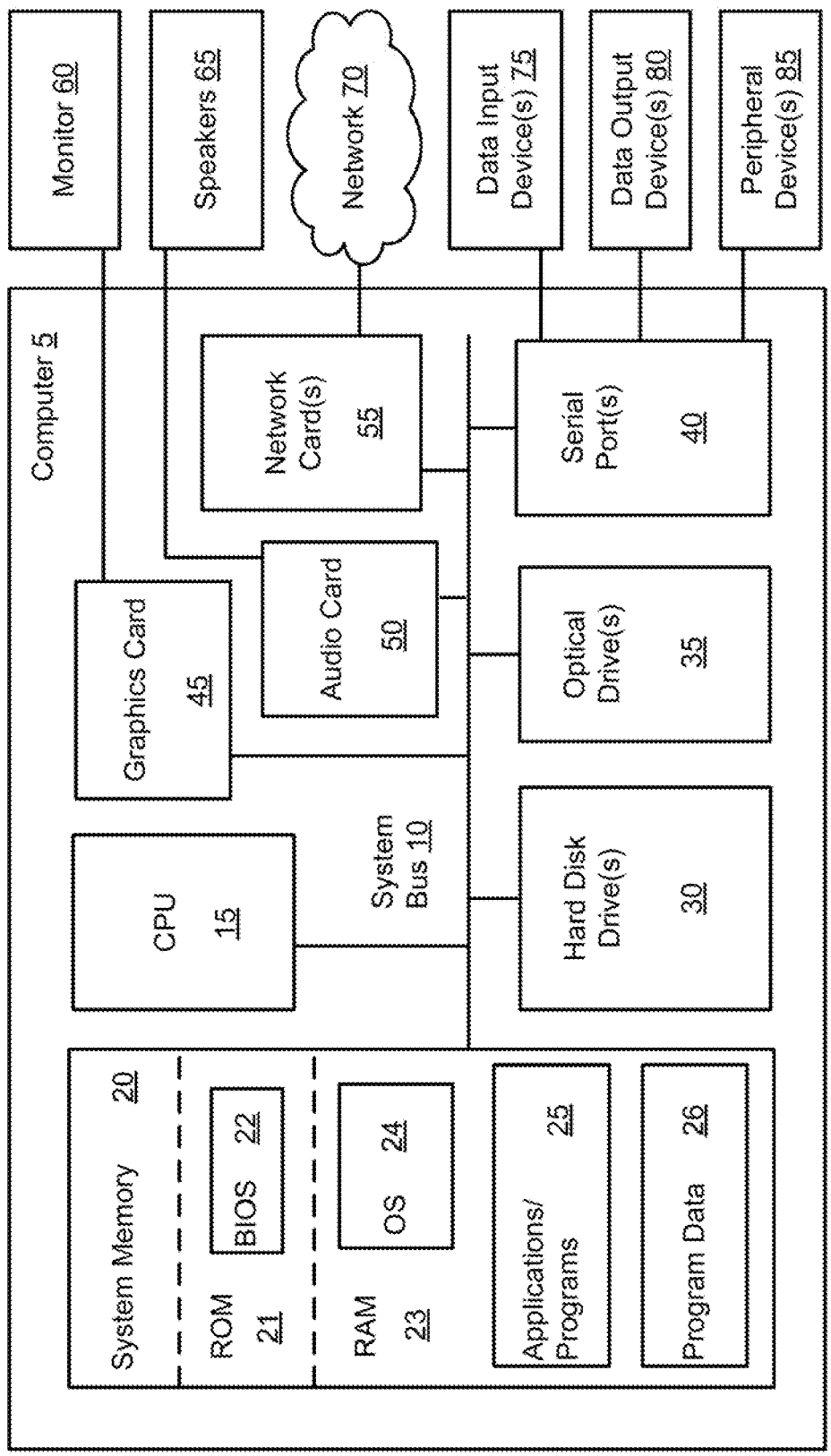
FIG. 6 illustrates an example embodiment of a general-purpose computer on which disclosed systems and methods for assessing danger of software objects using prioritizes security rating rules may be implemented.

FIG. 6 depicts one example embodiment of a computer system 5, which could be used to implement the system and methods for assessing security rating of software objects. As shown, computer 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores programs and programs 25. Memory 20 also stores various runtime data 26 used by programs 25.

Computer system 5 may further include hard disk drive(s) 30, such as SATA magnetic hard disk drive (HDO), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, programs and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMS, ROMs, EPROMs and other types of memory may also be used in alternative embodiments of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, Wifi, GSM, Bluetooth or other wired, wireless, or cellular network interface for connecting computer system 5 to network 70, such as the Internet.

In various embodiments, the systems and methods described herein may be implemented in hardware, software, firmware, or any combination thereof. If implemented in software, the functions may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a computer.

In the interest of clarity, not all of the routine features of the systems and methods are disclosed herein. It will be appreciated that in the development of any actual implementations, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and programs have been shown and described, it would be apparent to those skilled in the art having the benefit of this disclosure that many more modifications than mentioned above are possible without departing from the inventive concepts disclosed herein.

The invention claimed is:

1. A computer-implemented method for assessing danger of software objects, the method comprising:
 receiving, by a hardware processor, information about: a software object detected on a computer, one or more malicious characteristics of an Application Program Interface (API) function called by the software object, a security rating of the software object, and one or more security rating rules activated by the one or more malicious characteristics of the API to assess the security rating of the software object;
 determining a priority ranking of each security rating rule;
 applying the one or more security rating rules in a decreasing priority order until one of the one or more security rating rules indicates whether the software object is malicious or clean based on the one or more malicious characteristics of the API;

upon determining that the software object is a clean object, identifying parameters of the API function call that are characteristic of a clean software object;

generating a new security rating rule that identifies the software object as clean based on the parameters of the API function call; and assigning to the new security rule a higher priority ranking than the priority ranking of each of the security rating rules activated in assessing the security rating of the software object.

2. The method of claim 1, wherein the security rating rule is configured to provide the security rating to the software object based on an assessment of one or more malicious and non-malicious characteristics of the software object.

3. The method of claim 2, wherein the new security rating rule is configured to provide a lower security rating to the software object than the security rating given by the one or more security rating rules activated in assessing the security rating of the software object.

4. The method of claim 2, wherein the new security rating rule is configured to provide a negative security rating to the software object.

5. The method of claim 1, wherein applying the one or more security rating rules in the decreasing priority order further comprises skipping remaining security rating rules having a lower priority ranking than that of the one of the one or more security rating rules.

6. The method of claim 1, further comprising:
testing the new security rating rule on a plurality of known malicious objects by at least using the new security rule to assess security ratings of the plurality of known malicious objects; and
if the new security rule is configured to provide a low security rating to anyone of the known malicious objects, modifying the new security rating rule to include other non malicious characteristics of the analyzed software object that are distinct from characteristics of known malicious objects.

7. The method of claim 1, further comprising:
testing the new security rating rule on a plurality of known clean objects by at least using the new security rule to assess security ratings of the plurality of known clean objects; and
if the new security rule is configured to provide a high security rating to anyone of the known clean objects, modifying the new security rating rule to include other non-malicious characteristics of the analyzed software object that are distinct from characteristics of known malicious objects.

8. A system for assessing danger of software objects, the system comprising:
a hardware processor configured to:
receive information about: a software object detected on a computer, one or more malicious characteristics of an Application Program Interface (API) function called by the software object, a security rating of the software object, and one or more security rating rules activated by the one or more malicious characteristics of the API to assess the security rating of the software object;
determine a priority ranking of each security rating rule;
apply the one or more security rating rules in a decreasing priority order until one of the one or more security rating rules indicates whether the software object is malicious or clean based on the one or more malicious characteristics of the API;

upon determining that the software object is a clean object, identify parameters of the API function call that are characteristic of a clean software object;

generate a new security rating rule that identifies the software object as clean based on parameters of the API function call; and assign to the new security rule a higher priority ranking than the priority ranking of each of the security rating rules activated in assessing the security rating of the software object.

9. The system of claim 8, wherein the security rating rule is configured to provide the security rating to the software object based on an assessment of one or more malicious and non-malicious characteristics of the software object.

10. The system of claim 9, wherein the new security rating rule is configured to provide a lower security rating to the software object than the security rating given by the one or more security rating rules activated in assessing the security rating of the software object.

11. The system of claim 9, wherein the new security rating rule is configured to provide a negative security rating to the software object.

12. The system of claim 8, wherein the processor is further configured to:
test the new security rating rule on a plurality of known malicious objects by at least using the new security rule to assess security ratings of the plurality of known malicious objects; and
if the new security rule is configured to provide a low security rating to anyone of the known malicious objects, modify the new security rating rule to Include other non-malicious characteristics of the analyzed software object that are distinct from characteristics of known malicious objects.

13. The method of claim 8, wherein the processor is further configured to:
test the new security rating rule on a plurality of known clean objects by at least using the new security rule to assess security ratings of the plurality of known clean objects; and
if the new security rule is configured to provide a high security rating to anyone of the known clean objects, modify the new security rating rule to include other non-malicious characteristics of the analyzed software object that are distinct from characteristics of known malicious objects.

14. A non-transitory computer-readable storage medium having a computer program product stored thereon for assessing danger of software objects, the computer program product comprising instructions for:
receiving information about: a software object detected on a computer, one or more malicious characteristics of an Application Program interface (API) function called by the software object, a security rating of the software object, and one or more security rating rules activated by the one or more malicious characteristics of the API to assess the security rating of the software object;
determining a priority ranking of each security rating rule;
applying the one or more security rating rules in a decreasing priority order until one of the one or more security rating rules indicates whether the software object is malicious or clean based on the one or more malicious characteristics of the API;

upon determining that the software object is a clean object, identifying parameters of the API function call that are characteristic of a clean software object;

generating a new security rating rule that identifies the software object as dean based on parameters of the API function call; and assigning to the new security rule a higher priority ranking than the priority ranking of each of the security rating rules activated in assessing the security rating of the software object.

15. The computer-readable storage medium of claim 14, wherein the security rating rule is configured to provide the security rating to the software object based on an assessment of one or more malicious and non-malicious characteristics of the software object.

16. The computer-readable storage medium of claim 15, wherein the new security rating rule is configured to provide a lower security rating to the software object than the security rating given by the one or more security rating rules activated in assessing the security rating of the software object.

17. The computer-readable storage medium of claim 15, wherein the new security rating rule is configured to provide a negative security rating to the software object.

18. The computer-readable storage medium of claim 14, further including instructions for:

testing the new security rating rule on a plurality of known malicious objects by at least using the new security rule to assess security ratings of the plurality of known malicious objects; and if the new security rule is configured to provide a low security rating to anyone of the known malicious objects, modifying the new security rating rule to include other non-malicious characteristics of the analyzed software object that are distinct from characteristics of known malicious objects.

19. The computer-readable storage medium of claim 14, further including instructions for:

testing the new security rating rule on a plurality of known clean objects by at least using the new security rule to assess security ratings of the plurality of known clean objects; and if the new security rule is configured to provide a high security rating to anyone of the known clean objects, modifying the new security rating rule to include other non-malicious characteristics of the analyzed software object that are distinct from characteristics of known malicious objects.

* * * * *